(12) United States Patent
Messina

(10) Patent No.: US 10,740,839 B2
(45) Date of Patent: *Aug. 11, 2020

(54) SYSTEMS AND METHODS FOR IMPLEMENTING A CONFIRMATION PERIOD

(71) Applicant: Trading Technologies International, Inc., Chicago, IL (US)

(72) Inventor: Patricia A. Messina, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,030

(22) Filed: Jan. 24, 2014

(65) Prior Publication Data

US 2014/0143122 A1  May 22, 2014

Related U.S. Application Data

(63) Continuation of application No. 13/666,431, filed on Nov. 1, 2012, now Pat. No. 8,682,781.

(51) Int. Cl.
*G06Q 40/04* (2012.01)
*G06Q 40/00* (2012.01)
*G06Q 40/02* (2012.01)
*G06Q 40/06* (2012.01)

(52) U.S. Cl.
CPC .............. *G06Q 40/04* (2013.01); *G06Q 40/00* (2013.01); *G06Q 40/02* (2013.01); *G06Q 40/06* (2013.01)

(58) Field of Classification Search
CPC ........ G06Q 40/00; G06Q 40/02; G06Q 40/06; G06Q 40/04
See application file for complete search history.

(56) References Cited

U.S. PATENT DOCUMENTS

| | | | |
|---|---|---|---|
| 6,615,188 B1 * | 9/2003 | Breen | G06Q 40/04 705/37 |
| 7,437,325 B2 | 10/2008 | Kemp, II et al. | |
| 7,542,941 B1 | 6/2009 | Cohen | |

(Continued)

OTHER PUBLICATIONS

"Foreign Correspondence: The United States, New York, Aug. 17, 1891." Aug. 1891. The Economist, Weekly Commercial Times. vol. XLIX. pp. 1112-1113.*

(Continued)

*Primary Examiner* — Bennett M Sigmond
*Assistant Examiner* — Bolko M Hamerski
(74) *Attorney, Agent, or Firm* — McDonnell Boehnen Hulbert & Berghoff LLP

(57) ABSTRACT

Systems and methods for implementing a confirmation period are disclosed. An example method includes identifying a market condition associated with a quantity of a tradeable object of a trading strategy, wherein the market condition triggers an adjustment to the trading strategy; initiating a confirmation period in response to the market condition; when a reevaluation of the market condition during the confirmation period indicates that the market condition has ceased, preventing the adjustment to the trading strategy; and when the market condition persists throughout the confirmation period, proceeding with the adjustment to the trading strategy.

15 Claims, 8 Drawing Sheets

(56) References Cited

U.S. PATENT DOCUMENTS

| | | | |
|---|---|---|---|
| 7,599,876 B1* | 10/2009 | Lo | G06Q 40/04 705/37 |
| 7,644,030 B2 | 1/2010 | Burns et al. | |
| 7,729,978 B2 | 6/2010 | Mintz et al. | |
| 8,112,347 B2* | 2/2012 | Farrell | G06Q 40/04 705/37 |
| 8,180,692 B2 | 5/2012 | Kemp, II et al. | |
| 8,433,640 B2 | 4/2013 | Rooney | |
| 8,682,781 B1* | 3/2014 | Messina | G06Q 40/04 705/36 R |
| 2002/0156722 A1* | 10/2002 | Greenwood | G06Q 40/04 705/37 |
| 2005/0004852 A1* | 1/2005 | Whitney | G06Q 40/00 705/35 |
| 2005/0075963 A1* | 4/2005 | Balabon | G06Q 40/00 705/36 R |
| 2006/0229971 A1* | 10/2006 | Kelly | G06Q 40/04 705/37 |
| 2007/0038550 A1* | 2/2007 | Caille | G06Q 40/04 705/37 |
| 2007/0078752 A1 | 4/2007 | Burns et al. | |
| 2007/0179876 A1* | 8/2007 | Stark | G06Q 40/00 705/35 |
| 2008/0109288 A1 | 5/2008 | Borkovec et al. | |
| 2008/0288391 A1* | 11/2008 | Downs | G06Q 40/04 705/37 |
| 2009/0006244 A1 | 1/2009 | Kemp, II et al. | |
| 2009/0216674 A1* | 8/2009 | Nunes | G06Q 40/04 705/37 |
| 2011/0040668 A1* | 2/2011 | Lee | G06Q 40/04 705/37 |
| 2011/0099124 A1 | 4/2011 | Brianti et al. | |
| 2011/0145126 A1 | 6/2011 | Rooney | |
| 2012/0254007 A1 | 10/2012 | Unetich | |
| 2013/0080308 A1 | 3/2013 | Messina et al. | |
| 2014/0143123 A1* | 5/2014 | Banke | G06Q 40/04 705/37 |

OTHER PUBLICATIONS

"Foreign Correspondence: The United States, New York, Aug. 17, 1891." Aug. 1891. The Economist, Weekly Commercial Times. vol. XLIX. pp. 1112-1113. (Year: 1891).*

Nuti, G., Algorithmic Trading, Computer (vol. 44, Issue: 11, pp. 61-69); Nov. 1, 2011 (Year: 2011).*

Shin, Jhinyoung. "Essays on Financial Market Microstructure (Informed Traders)" Abstract of PhD dissertation, Carnegie-Mellon University, 1 page, 1993. [Retrieved from the Internet on Oct. 17, 2013] https://www.dialogclassic.com.

* cited by examiner

SYSTEMS AND METHODS FOR IMPLEMENTING A CONFIRMATION PERIOD

CROSS REFERENCE TO RELATED APPLICATIONS

The present application is a continuation of U.S. patent application Ser. No. 13/666,431, filed Nov. 1, 2012, now U.S. Pat. No. 8,682,781, and entitled "Systems and Methods for Implementing a Confirmation Period," the contents of which are fully incorporated herein by reference for all purposes.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

In addition to trading single items, a user may trade more than one item according to a trading strategy. One common trading strategy is a spread and trading according to a spread trading strategy may also be referred to as spread trading. Spread trading may attempt to capitalize on changes or movements in the relationships between the items in the trading strategy, for example.

BRIEF DESCRIPTION OF THE FIGURES

Certain embodiments are disclosed with reference to the following drawings.

Figure 1:
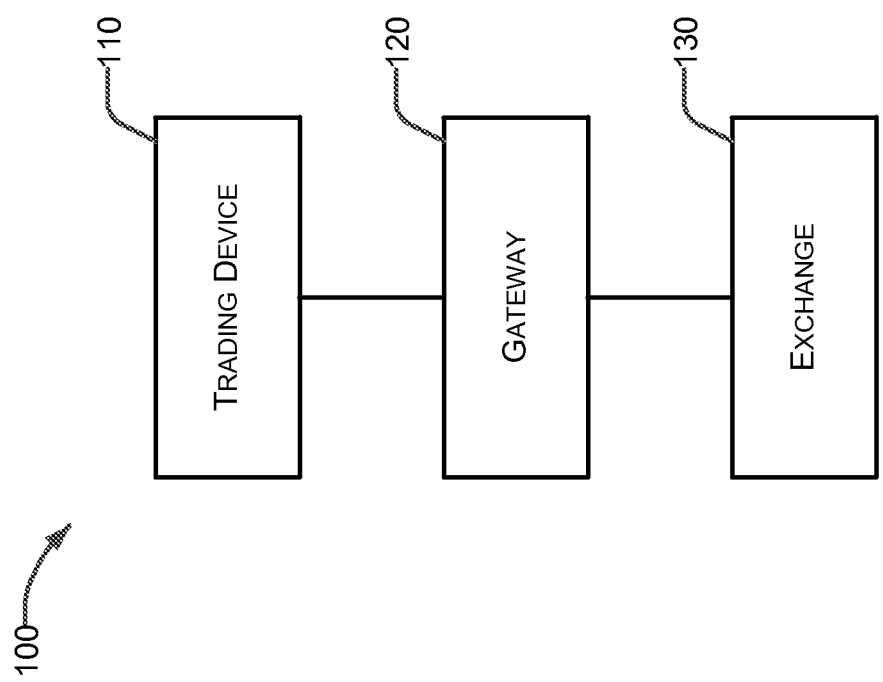
FIG. 1 illustrates a block diagram representative of an example electronic trading system in which certain embodiments may be employed.

Certain embodiments will be better understood when read in conjunction with the provided figures, which illustrate examples. It should be understood, however, that the embodiments are not limited to the arrangements and instrumentality shown in the attached figures.

DETAILED DESCRIPTION

The disclosed embodiments relate to trading strategies and, more particularly, to systems and methods to implement a confirmation period.

Certain dynamic trading tools enable an adjustment of one or more aspects of, for example, a spread. When a spread includes a quoting leg having a quoting quantity and a lean or hedge leg having a leaned-on quantity, the dynamic trading tools provide the ability to adjust the quantity of the quoting leg in response to one or more conditions associated with, for example, an available quantity of the leaned-on tradeable object. Adjusting the quantity of the quoting leg can include changing a quantity of the quoting leg or cancelling the quoting leg. An example condition having the potential to trigger an adjustment is the available quantity of the leaned-on tradeable object dropping below a threshold. The threshold may be based on a current quoting quantity and one or more considerations regarding the available quantity of the leaned-on object being sufficient to fill the current quoting quantity. Additional or alternative conditions may trigger an adjustment.

Adjustments executed by the dynamic trading tools typically cause a corresponding user to incur fees and/or are subject to restrictions put in place by an exchange. For example, an exchange may require a user to receive at least one fill for every twenty quoting orders placed (or adjustments made those orders) or be subject to having orders rejected or assessed a fee. Therefore, in some instances, frequent adjustments to a quoting quantity of a spread lead to excessive fees and/or other types of undesirable outcomes. Moreover, some adjustments made by the dynamic trading tools, such as a cancellation of an order, cause a corresponding user to lose a previously held position in a queue at an exchange. In other words, adjustments can result in the corresponding order being placed at an end of the queue, thereby reducing a likelihood of having the order filled as desired.

Embodiments disclosed herein recognize that a detected condition having the potential to trigger an adjustment may only exist for a small amount of time and, thus, may correspond to an outlier condition. Embodiments disclosed herein also recognize that, in such instances, immediately reacting to the detected condition may be detrimental in that, for example, a queue position is lost and/or fees may be incurred despite the brief existence of the triggering condition. In other words, embodiments disclosed herein recognize that a market characteristic associated with the triggering condition may quickly return or bounce back to an acceptable value, thereby rendering the corresponding adjustment unwanted.

To avoid instances in which an adjustment is automatically executed in response to conditions that exist only briefly, embodiments disclosed herein implement a confirmation period. The example confirmation periods disclosed herein reduce a number of times an order is adjusted or cancelled, in connection with, for example, a dynamically adjusted spread. In particular, when a condition having the potential to trigger an adjustment is detected, embodiments disclosed herein initiate a confirmation period during which the condition is reevaluated. According to embodiments disclosed herein, a duration of the confirmation period is based on, for example, a fixed amount of time, a fixed number of market updates, a dynamically calculated value, an identity of a market in which one or legs of the spread are being traded, and/or any other suitable factor. Embodiments disclosed herein determine whether the condition that triggered the potential adjustment persists during the confirmation or ceases to exist during the confirmation period. When the condition persists throughout the confirmation period, embodiments disclosed herein proceed with the triggered adjustment. On the other hand, when the condition ceases to exist during the confirmation period, embodiments disclosed herein prevent the triggered adjustment from being executed. As a result, embodiments disclosed herein prevent an overreaction to outlier conditions or blips in the market and, thus, maintain queue position for the corresponding trade and/or avoid incurring additional fees.

Although this description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

I. Brief Description of Certain Embodiments

Certain embodiments provide an example method including identifying a market condition associated with a quantity of a tradeable object of a trading strategy, wherein the market condition triggers an adjustment to the trading strategy. The example method includes initiating a confirmation period in response to the market condition. The example method includes, when a reevaluation of the market condition during the confirmation period indicates that the market condition has ceased, preventing the adjustment to the trading strategy. The example method includes, when the market condition persists throughout the confirmation period, proceeding with the adjustment to the trading strategy.

Certain embodiments provide a tangible machine readable storage medium comprising example instructions that, when executed, cause a machine to identify a condition associated with a quantity of an object of a strategy, wherein a leg of the strategy leans on the object. The example instructions cause the machine to initiate a confirmation period in response to the condition. The example instructions cause the machine to, when the condition persists throughout the confirmation period, proceed with an adjustment to the leg triggered by the detection of the condition. The example instructions cause the machine to, when the condition ceases during the confirmation period, prevent the adjustment to the leg.

Certain embodiments provide an example apparatus including a computing device to identify a market condition associated with a quantity of a tradeable object of a trading strategy, wherein the market condition triggers an adjustment to the trading strategy. The computing device of the example apparatus is to initiate a confirmation period in response to the market condition. The computing device of the example apparatus is to prevent the adjustment to the trading strategy when a reevaluation of the market condition during the confirmation period indicates that the market condition has ceased. The computing device of the example apparatus is to proceed with the adjustment to the trading strategy when the market condition when the market condition persists throughout the confirmation period.

II. Example Electronic Trading System

FIG. 1 illustrates a block diagram representative of an example electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradeable objects to the exchange 130.

Market data may include data about a market for a tradeable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradeable object is anything which may be traded. For example, a certain quantity of the tradeable object may be bought or sold for a particular price. A tradeable object may include, for example, financial products, stocks, options, bonds, future contracts, currency, warrants, funds derivatives, securities, commodities, swaps, interest rate products, index-based products, traded events, goods, or a combination thereof. A tradeable object may include a product listed and/or administered by an exchange (for example, the exchange 130), a product defined by the user, a combination of real or synthetic products, or a combination thereof. There may be a synthetic tradeable object that corresponds and/or is similar to a real tradeable object.

An order message is a message that includes a trade order. A trade order may be, for example, a command to place an order to buy or sell a tradeable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or a combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill.

("Trading Technologies"). As another example, the trading device 110 may be a server running a trading application providing automated trading tools such as ADL™, AUTOSPREADER®, and/or AUTOTRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or unrequested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the Intercontinental Exchange, and Eurex. The exchange 130 may include an electronic matching system, such as a computer, server, or other computing device, which is adapted to allow tradeable objects, for example, offered for trading by the exchange, to be bought and sold. The exchange 130 may include separate entities, some of which list and/or administer tradeable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradeable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
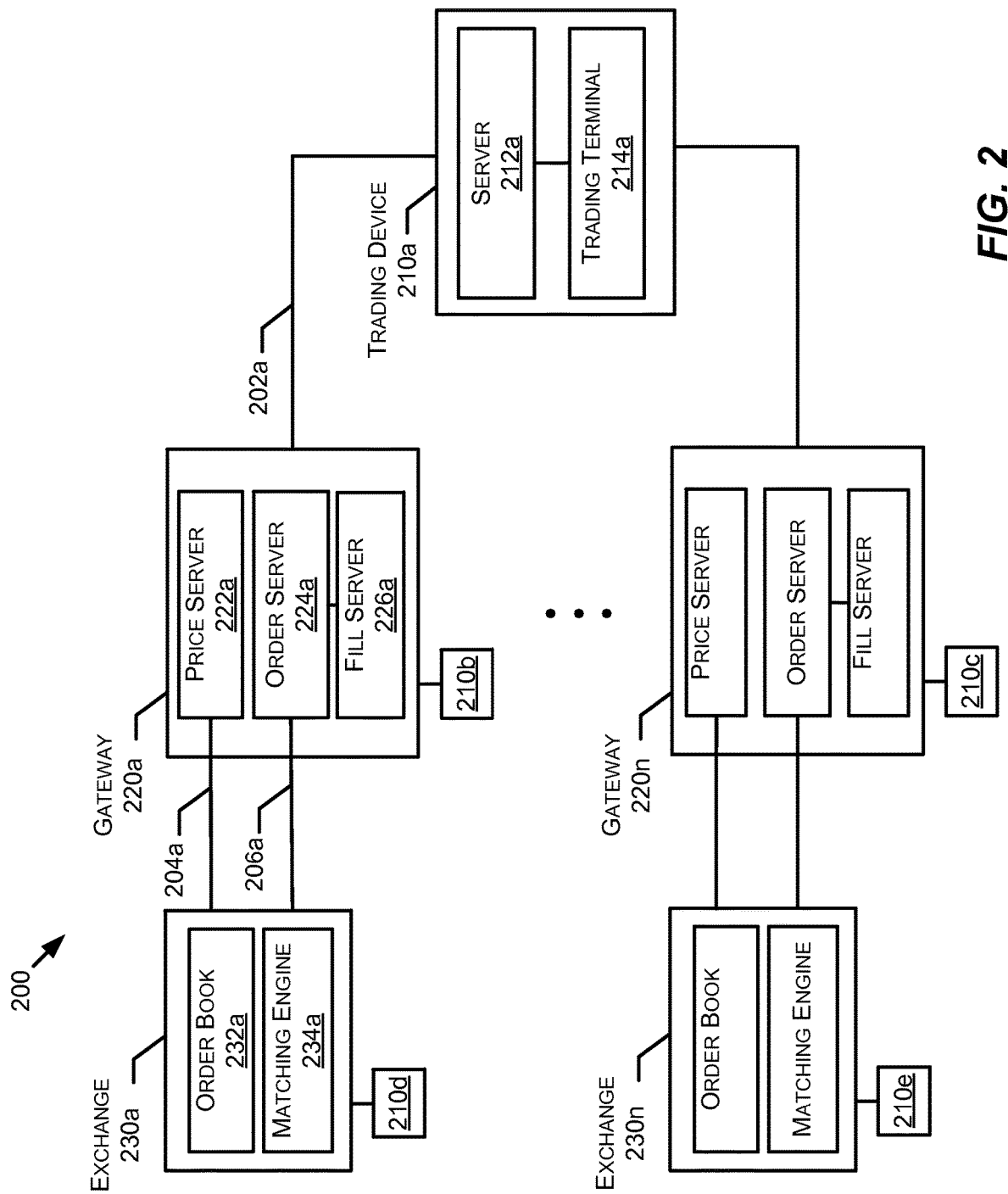
FIG. 2 illustrates a block diagram of another example electronic trading system in which certain embodiments may be employed.

FIG. 2 illustrates a block diagram of another example electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradeable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradeable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

Iv. Example Computing Device

Figure 3:
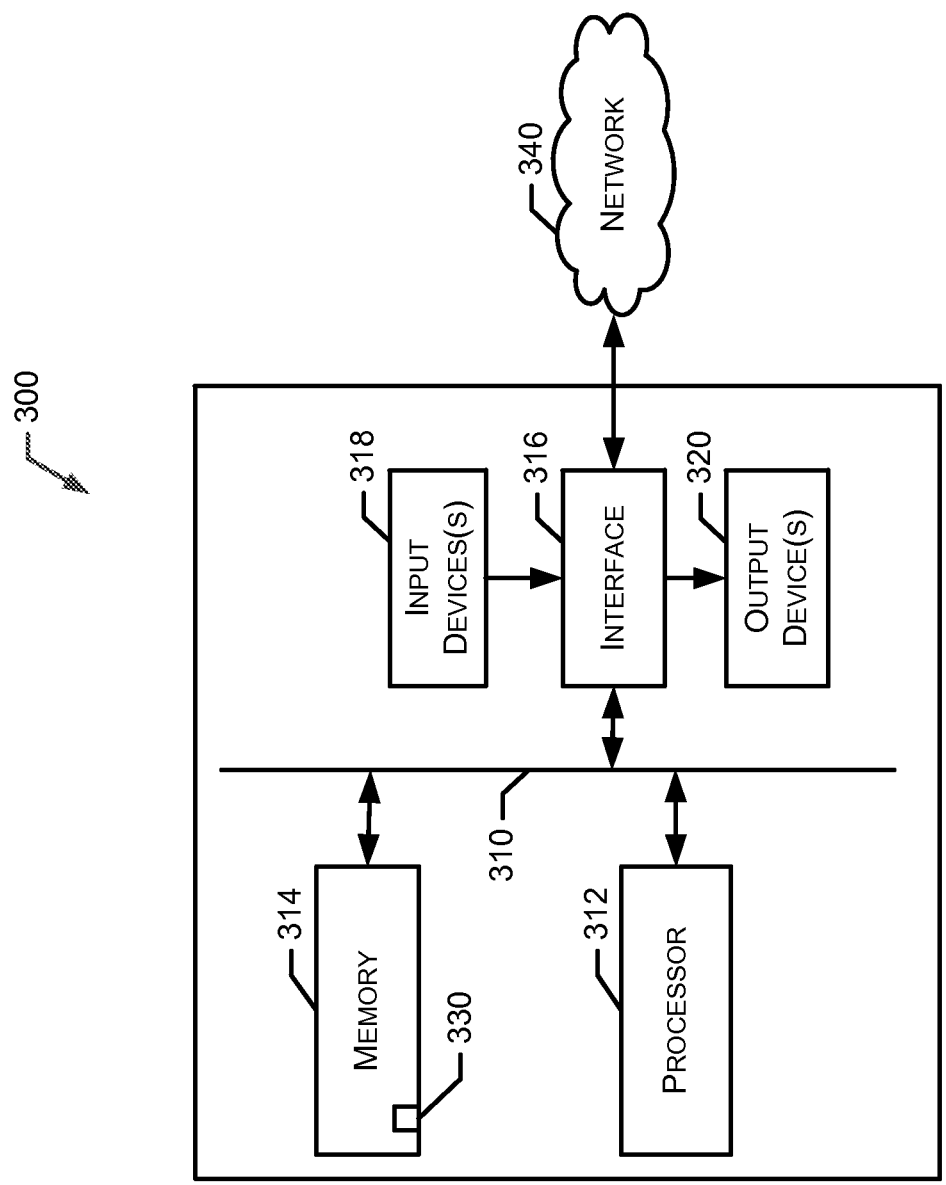
FIG. 3 illustrates a block diagram of an example computing device which may be used to implement the disclosed embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example.

The computing device 300 includes a communication network 310, a processor 312, a memory 314, an interface 316, an input device 318, and an output device 320. The computing device 300 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, electrical or optical network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Strategy Trading

In addition to buying and/or selling a single tradeable object, a user may trade more than one tradeable object according to a trading strategy. One common trading strategy is a spread and trading according to a trading strategy may also be referred to as spread trading. Spread trading may attempt to capitalize on changes or movements in the relationships between the tradeable object in the trading strategy, for example.

An automated trading tool may be utilized to trade according to a trading strategy, for example. For example, the automated trading tool may AUTOSPREADER®, provided by Trading Technologies.

A trading strategy defines a relationship between two or more tradeable objects to be traded. Each tradeable object being traded as part of a trading strategy may be referred to as a leg or outright market of the trading strategy.

When the trading strategy is to be bought, the definition for the trading strategy specifies which tradeable object corresponding to each leg should be bought or sold. Similarly, when the trading strategy is to be sold, the definition specifies which tradeable objects corresponding to each leg should be bought or sold. For example, a trading strategy may be defined such that buying the trading strategy involves buying one unit of a first tradeable object for leg A and selling one unit of a second tradeable object for leg B. Selling the trading strategy typically involves performing the opposite actions for each leg.

In addition, the definition for the trading strategy may specify a spread ratio associated with each leg of the trading strategy. The spread ratio may also be referred to as an order size for the leg. The spread ratio indicates the quantity of each leg in relation to the other legs. For example, a trading strategy may be defined such that buying the trading strategy involves buying 2 units of a first tradeable object for leg A and selling 3 units of a second tradeable object for leg B. The sign of the spread ratio may be used to indicate whether the leg is to be bought (the spread ratio is positive) or sold (the spread ratio is negative) when buying the trading strategy. In the example above, the spread ratio associated with leg A would be "2" and the spread ratio associated with leg B would be "−3."

In some instances, the spread ratio may be implied or implicit. For example, the spread ratio for a leg of a trading strategy may not be explicitly specified, but rather implied or defaulted to be "1" or "−1."

In addition, the spread ratio for each leg may be collectively referred to as the spread ratio or strategy ratio for the trading strategy. For example, if leg A has a spread ratio of "2" and leg B has a spread ratio of "−3", the spread ratio (or strategy ratio) for the trading strategy may be expressed as "2:−3" or as "2:3" if the sign for leg B is implicit or specified elsewhere in a trading strategy definition.

Additionally, the definition for the trading strategy may specify a multiplier associated with each leg of the trading strategy. The multiplier is used to adjust the price of the particular leg for determining the price of the spread. The multiplier for each leg may be the same as the spread ratio. For example, in the example above, the multiplier associated with leg A may be "2" and the multiplier associated with leg B may be "−3," both of which match the corresponding spread ratio for each leg. Alternatively, the multiplier associated with one or more legs may be different than the corresponding spread ratios for those legs. For example, the values for the multipliers may be selected to convert the prices for the legs into a common currency.

The following discussion assumes that the spread ratio and multipliers for each leg are the same, unless otherwise indicated. In addition, the following discussion assumes that the signs for the spread ratio and the multipliers for a particular leg are the same and, if not, the sign for the multiplier is used to determine which side of the trading strategy a particular leg is on.

Figure 4:
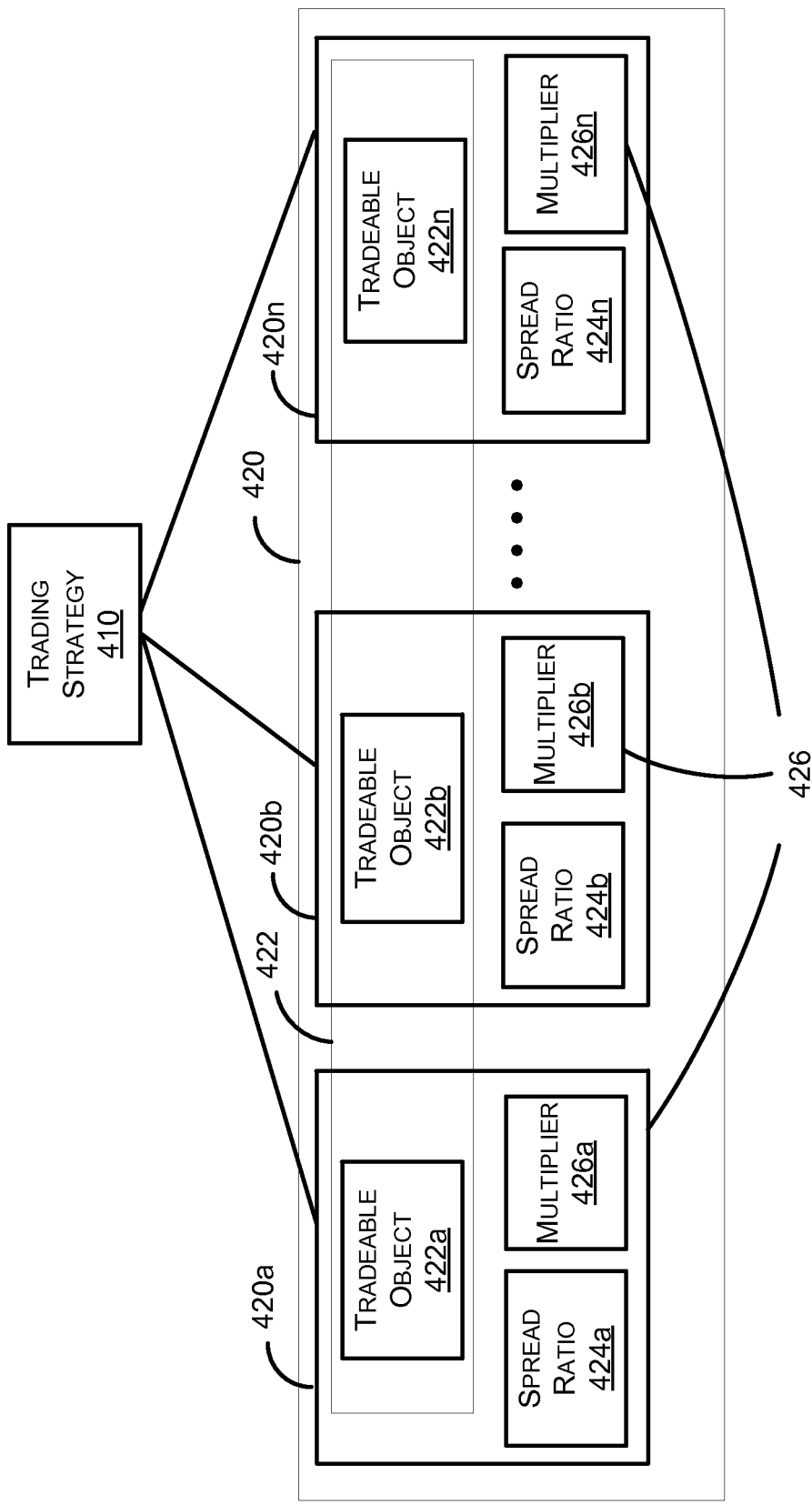
FIG. 4 illustrates a block diagram of a trading strategy which may be employed with certain disclosed embodiments.

FIG. 4 illustrates a block diagram of a trading strategy 410 which may be employed with certain disclosed embodiments. The trading strategy 410 includes "n" legs 420 (individually identified as leg 420a to leg 420n). The trading strategy 410 defines the relationship between tradeable objects 422 (individually identified as tradeable object 422a to tradeable object 422n) of each of the legs 420a to 420n using the corresponding spread ratios 424a to 424n and multipliers 426a to 426n.

Once defined, the tradeable objects 422 in the trading strategy 410 may then be traded together according to the defined relationship. For example, assume that the trading strategy 410 is a spread with two legs, leg 420a and leg 420b. Leg 420a is for tradeable object 422a and leg 420b is for tradeable object 422b. In addition, assume that the spread ratio 424a and multiplier 426a associated with leg 420a are "1" and that the spread ratio 424b and multiplier 426b associated with leg 420b are "−1". That is, the spread is defined such that when the spread is bought, 1 unit of tradeable object 422a is bought (positive spread ratio, same direction as the spread) and 1 unit of tradeable object 422b is sold (negative spread ratio, opposite direction of the spread). As mentioned above, typically in spread trading the opposite of the definition applies. That is, when the definition for the spread is such that when the spread is sold, 1 unit of tradeable object 422a is sold (positive spread ratio, same direction as the spread) and 1 unit of tradeable object 422b is bought (negative spread ratio, opposite direction of the spread).

The price for the trading strategy 410 is determined based on the definition. In particular, the price for the trading strategy 410 is typically the sum of price the legs 420 comprising the tradeable objects 422 multiplied by corresponding multipliers 426. The price for a trading strategy may be affected by price tick rounding and/or pay-up ticks. However, both of these implementation details are beyond the scope of this discussion and are well-known in the art.

As discussed above, a real spread may be listed at an exchange, such as exchange 130 and/or 230, as a tradeable product. In contrast, a synthetic spread may not be listed as a product at an exchange, but rather the various legs of the spread are tradeable at one or more exchanges. For the purposes of the following example, the trading strategy 410 described is a synthetic trading strategy. However, similar techniques to those described below may also be applied by an exchange when a real trading strategy is traded.

Continuing the example from above, if it is expected or believed that tradeable object 422a typically has a price 10 greater than tradeable object 422b, then it may be advantageous to buy the spread whenever the difference in price between tradeable objects 422a and 422b is less than 10 and sell the spread whenever the difference is greater than 10. As an example, assume that tradeable object 422a is at a price of 45 and tradeable object 422b is at a price of 40. The current spread price may then be determined to be (1)(45)+(−1)(40)=5, which is less than the typical spread of 10. Thus, a user may buy 1 unit of the spread, which results in buying 1 unit of tradeable object 422a at a price of 45 and selling 1 unit of tradeable object 422b at 40. At some later time, the typical price difference may be restored and the price of tradeable object 422a is 42 and the price of tradeable object 422b is 32. At this point, the price of the spread is now 10. If the user sells 1 unit of the spread to close out the user's position (that is, sells 1 unit of tradeable object 422a and buys 1 unit of tradeable object 422b), the user has made a profit on the total transaction. In particular, while the user bought tradeable object 422a at a price of 45 and sold at 42, losing 3, the user sold tradeable object 422b at a price of 40 and bought at 32, for a profit of 8. Thus, the user made 5 on the buying and selling of the spread.

The above example assumes that there is sufficient liquidity and stability that the tradeable objects can be bought and sold at the market price at approximately the desired times. This allows the desired price for the spread to be achieved. However, more generally, a desired price at which to buy or sell a particular trading strategy is determined. Then, an automated trading tool, for example, attempts to achieve that desired price by buying and selling the legs at appropriate prices. For example, when a user instructs the trading tool to buy or sell the trading strategy 410 at a desired price, the automated trading tool may automatically place an order (also referred to as quoting an order) for one of the tradeable objects 422 of the trading strategy 410 to achieve the desired price for the trading strategy (also referred to as a desired strategy price, desired spread price, and/or a target price). The leg for which the order is placed is referred to as the quoting leg. The other leg is referred to as a lean leg and/or a hedge leg. The price that the quoting leg is quoted at is based on a target price that an order could be filled at in the lean leg. The target price in the hedge leg is also known as the leaned-on price, lean price, or lean level. Typically, if there is sufficient quantity available, the target price may be the best bid price when selling and the best ask price when buying. The target price may be different than the best price available if there is not enough quantity available at that price or because it is an implied price, for example. As the leaned-on price changes, the price for the order in the quoting leg may also change to maintain the desired strategy price.

The leaned-on price may also be determined based on a lean multiplier and/or a lean base. A lean multiplier may specify a multiple of the order quantity for the hedge leg that should be available to lean on that price level. For example, if a quantity of 10 is needed in the hedge leg and the lean multiplier is 2, then the lean level may be determined to be the best price that has at least a quantity of 20 available. A lean base may specify an additional quantity above the needed quantity for the hedge leg that should be available to lean on that price level. For example, if a quantity of 10 is needed in the hedge leg and the lean base is 5, then the lean level may be determined to be the best price that has at least a quantity of 15 available. The lean multiplier and lean base may also be used in combination. For example, the lean base and lean multiplier may be utilized such that larger of the two is used or they may be used additively to determine the amount of quantity to be available.

When the quoting leg is filled, the automated trading tool may then submit an order in the hedge leg to complete the strategy. This order may be referred to as an offsetting or hedging order. The offsetting order may be placed at the leaned-on price or based on the fill price for the quoting order, for example. If the offsetting order is not filled (or filled sufficiently to achieve the desired strategy price), then the strategy order is said to be "legged up" or "legged" because the desired strategy relationship has not been achieved according to the trading strategy definition.

In addition to having a single quoting leg, as discussed above, a trading strategy may be quoted in multiple (or even all) legs. In such situations, each quoted leg still leans on the other legs. When one of the quoted legs is filled, typically the orders in the other quoted legs are cancelled and then appropriate hedge orders are placed based on the lean prices that the now-filled quoting leg utilized.

VI. Dynamic Leaning

Dynamic leaning involves adjusting quantity in a quoting leg based on an available leaned-on quantity. For example, the quantity in the quoting leg may be reduced when the available leaned-on quantity decreases. Some dynamic leaning mechanisms and techniques are discussed in U.S. Pat. No. 7,729,978, filed on Mar. 28, 2007, and U.S. patent application Ser. No. 13/245,406, filed Sep. 26, 2011. The contents of U.S. Pat. No. 7,729,978 and the contents of U.S. patent application Ser. No. 13/245,406 are fully incorporated herein by reference.

In some previous implementations of dynamic leaning, the quoting quantities are adjusted each time a change occurs in the corresponding available leaned-on quantity, regardless of a magnitude of the change in the available leaned-on quantity. Such previous implementations have the potential of adjusting the quoting quantities are significant number of times. In many exchanges, adjustment of the quoting quantity incurs a fee or penalty. Alternatively, some exchanges require a certain amount of quoting quantity to be filled. Moreover, adjustment of the quoting quantity, which may include cancellation of the quoting order, often results in loss of queue position. Thus, in some instances, adjustments, or at least a large number of adjustments, may be undesirable.

VII. Confirmation Period

Figure 5A:
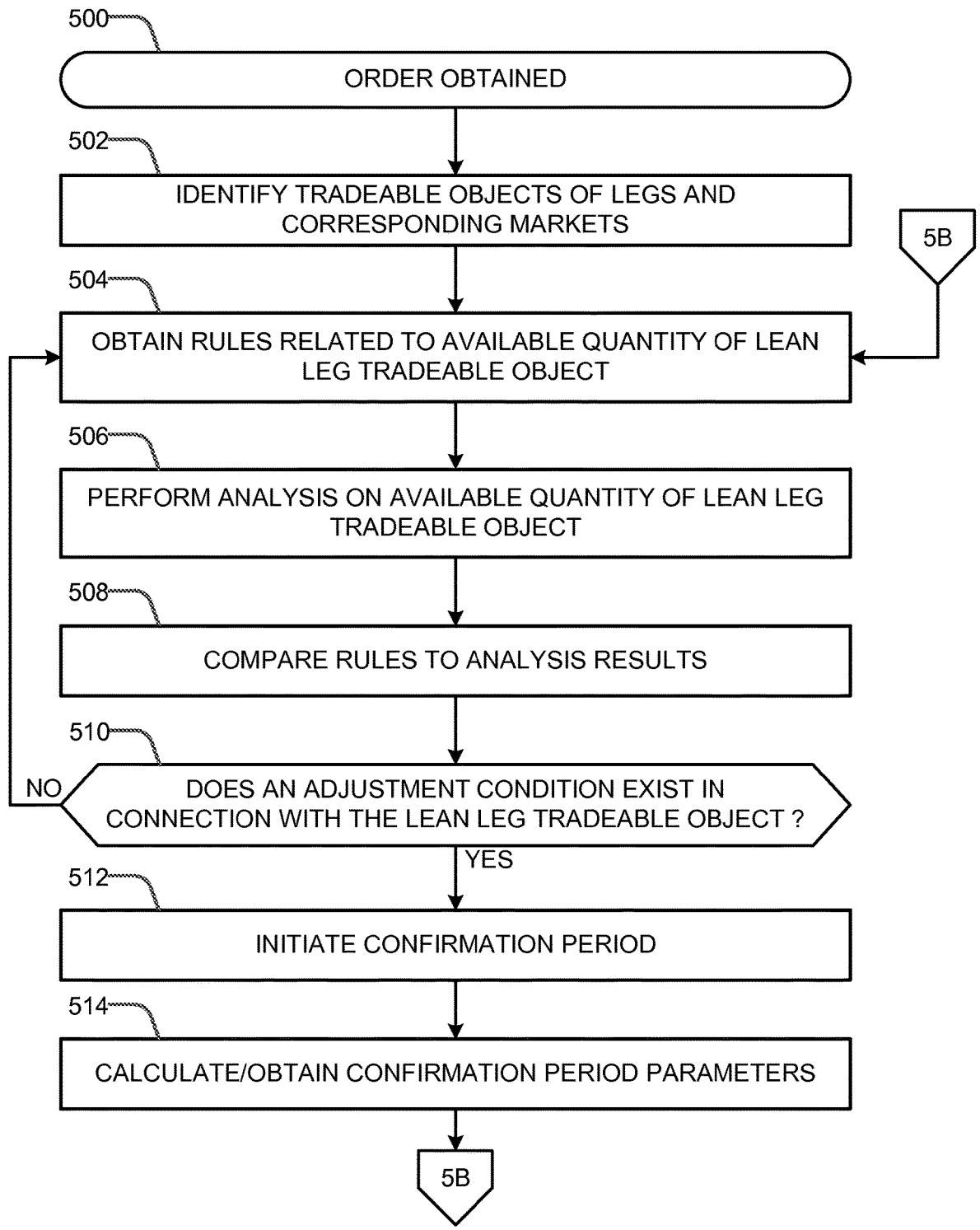
FIGS. 5A and 5B are flowcharts representative of example machine readable instructions that may be executed to implement disclosed embodiments.
Figure 5B:
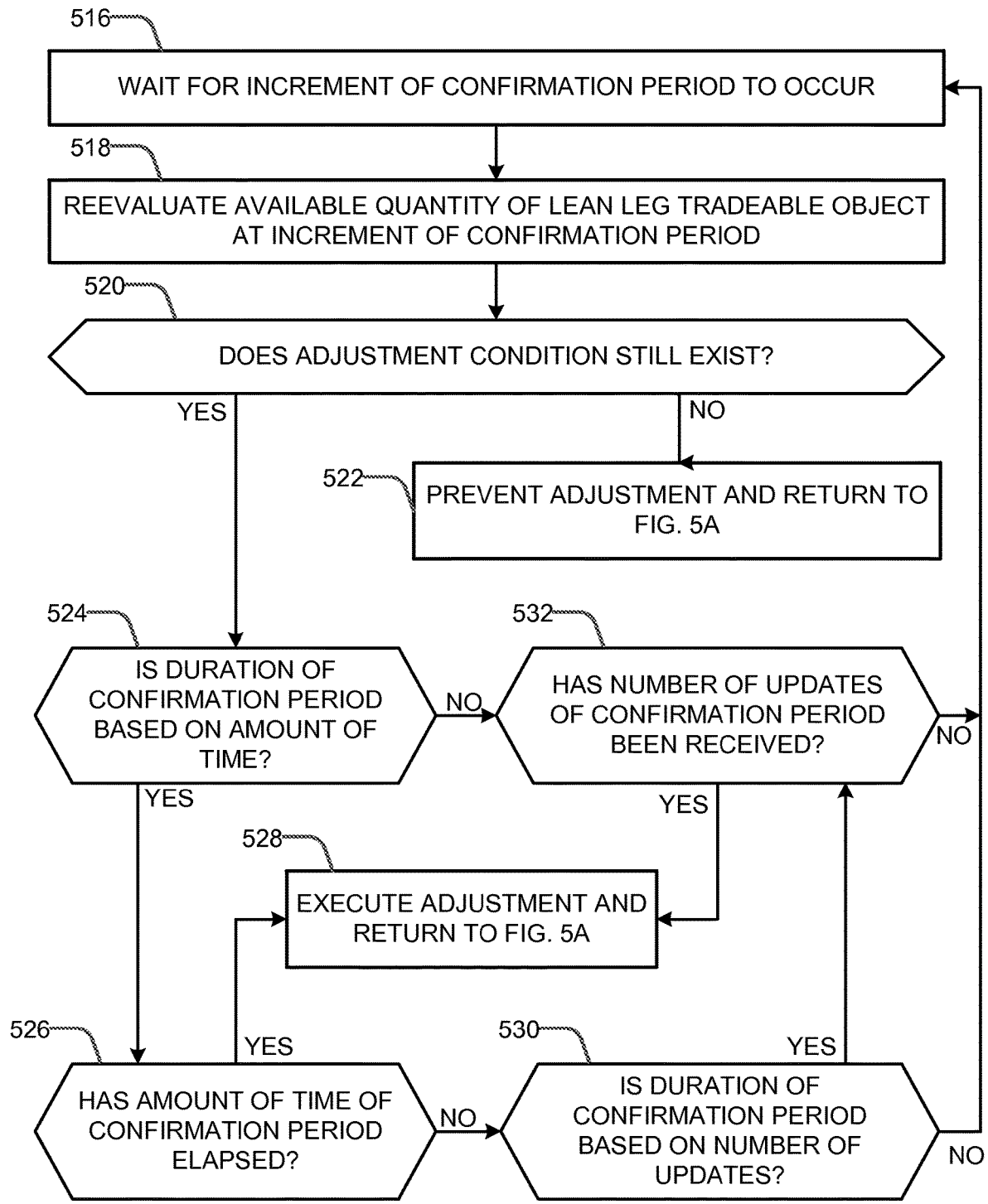
Figure 6:
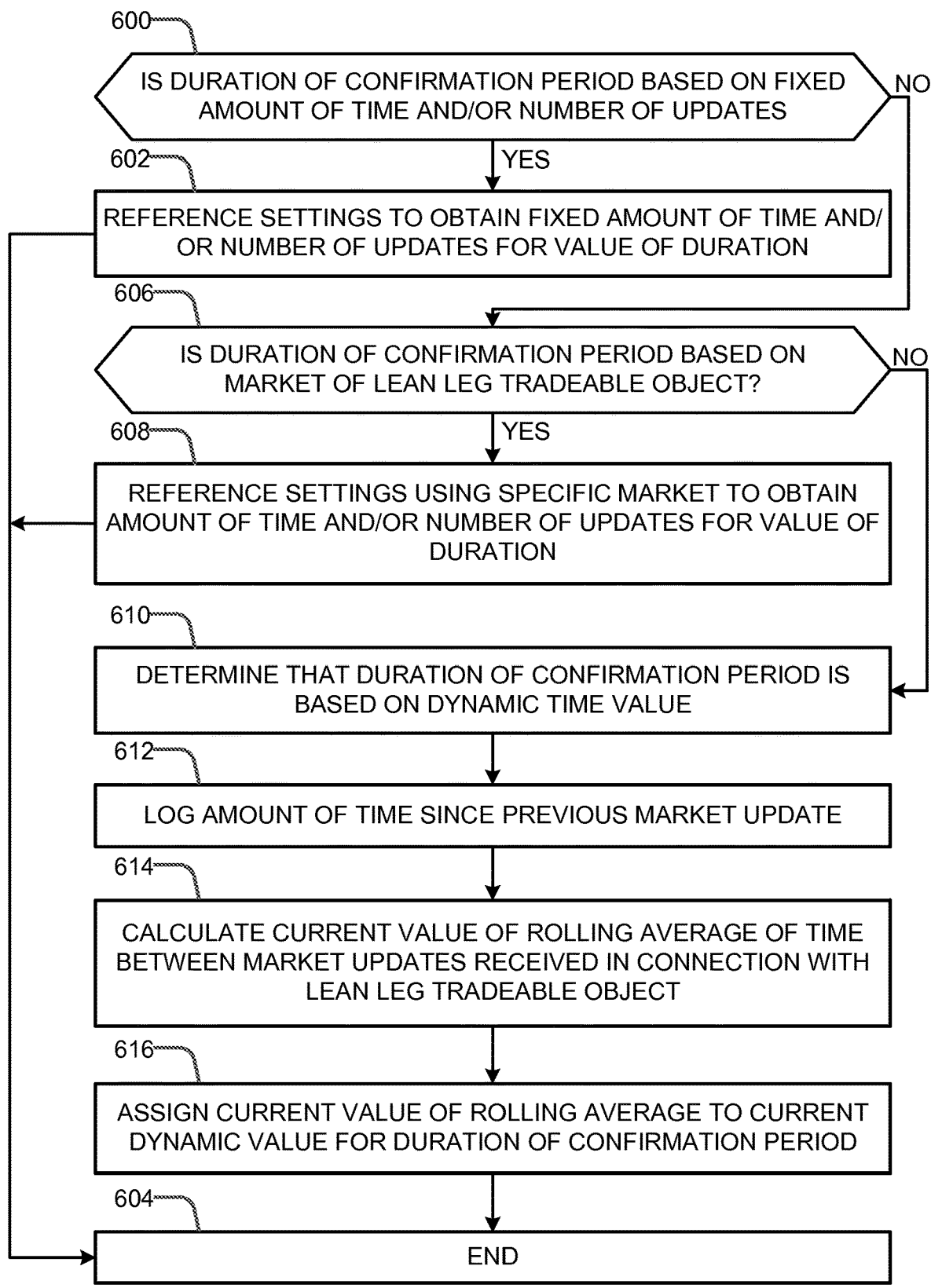
FIG. 6 is a flowchart representative of example machine readable instructions that may be executed to implement disclosed embodiments.

FIGS. 5A, 5B and 6 are flowcharts representative of example operations that can be executed to implement the teachings of this disclosure. The example operations of FIGS. 5A, 5B and/or 6 can be implemented by, for example, the trading application 330 stored on and executed by the example trading device 110 of FIG. 1 and/or the example trading device 210 of FIG. 2. While the example trading device 110 of FIG. 1 is described as implementing the example operations of FIGS. 5A, 5B and 6 below, any suitable device can implement the example operations of FIGS. 5A, 5B and/or 6. The example operations of FIGS. 5A, 5B and 6 provide a confirmation period to determine whether a triggered adjustment should be prevented or implemented based on whether a condition that triggered the adjustment persists during the confirmation period. To achieve this processing efficiency, the example operations of FIGS. 5A, 5B and 6 include initiating a confirmation period in response to detection of the condition, reevaluating the condition during and/or after the confirmation period, and determining whether one or more parameters associated with the condition return to value(s) that do not necessitate the adjustment. If the example operations of FIGS. 5A, 5B and/or 6 determine that the parameters of the condition have bounced back to acceptable level(s), the triggered adjustment is prevented. In some examples, the duration of the confirmation period is fixed and based on, for example, a user configurable setting. In some examples, the duration of the confirmation period is defined by a fixed amount of time. In some examples, the duration of the confirmation period is defined by a fixed number of received market updates. In some examples, the duration of the confirmation period is based on the market or exchange on which an object of the spread is being traded. In some examples, the duration of the confirmation period is dynamic and based on, for example, a rolling average of amounts of time between market updates. Additional or alternative durations and/or bases for defining the duration are possible.

The example of FIG. 5A begins with the trading device 110 obtaining a trading strategy (block 500). For example, the obtained trading strategy may have been placed by a user and/or generated by an automated trading tool. The tradeable objects of a lean leg and the corresponding quoting leg of the order are identified, along with the markets or exchanges at which the identified tradeable objects are being traded in connection with the obtained trading strategy (block 502). In the illustrated example, a trading tool implements one or more adjustment strategies defined by one or more adjustment rules. The example trading device 110 utilizes the adjustment rules that apply to the identified tradeable objects of the order (block 504). The rules of the illustrated example include one or more adjustments to be made to one or more aspects of the trading strategy in response to one or more conditions. Example adjustments to be made to the objects of the trading strategy include cancellation of an order, changes to quantity of an order and/or changes in price of an order. Example conditions of the rules that have the potential to trigger such adjustments include an available quantity of a leaned-on object falling below a threshold. For example, the trading device 110 operating in accordance with the rules may trigger a cancellation or quantity change of a quoting order of the trading strategy when the available quantity of the lean leg object reaches or falls below a minimum quantity defined in the rules.

To determine whether any of the rules that apply to the current order have been violated by, for example, a threshold quantity of the leaned-on object being reached, the example trading device 110 performs an analysis on the one or more market conditions associated with the rules (block 506). In the illustrated example of FIG. 5A, the currently available quantity of the lean leg tradeable object is identified to determine a corresponding current market depth (block 506). Additional or alternative conditions of the market associated with the lean leg tradeable object may be generated and/or obtained. For example, factors related to a price associated with the lean leg tradeable object, such as a movement of the price and/or a number of ticks associated with the lean leg tradeable object may be checked. In some examples, a slop quote check and/or a smart quote check are performed to filter out movements in price within a tolerance set by, for example, the trading device 110. The results of the analysis are compared to the rules that define the adjustment triggering condition(s) (block 508). In the illustrated example, the rules include threshold and/or percentages for the available quantity in the lean leg based on, for example, a quantity of the quoting leg. In other words, the rules include expressions, algorithms, and/or other type(s) of calculations that dictate a value of a threshold available quantity in the leaned-on market. For example, a threshold available quantity for the lean leg may be set by the rules to correspond to a certain percentage of the associated quoting leg. When none of the rules is violated according to the comparison of the analysis results and the rules, control returns to block 504 (block 510). When one or more of the rules is violated, thereby triggering an adjustment, an adjustment condition is said to exist in connection with the trading strategy and control proceeds to block 512.

In the illustrated example of FIG. 5A, a confirmation period is initiated in response to the detection of the adjustment condition (block 512). The confirmation period of the illustrated example provides an opportunity for a value associated with the detected adjustment condition to resolve or return back to a level that does not violate the rule before the corresponding adjustment is executed or performed. Therefore, when the example confirmation period of FIG. 5A is implemented in connection with, for example, a dynamic trading tool that makes adjustments to orders, at least some of the adjustments are not performed immediately after detection of an adjustment condition. Instead, such a system delays or, if the adjustment condition ceases during the confirmation period, cancels the adjustment corresponding to the violated rule.

In the example of FIG. 5A, one or more parameters of the example confirmation period are calculated and/or obtained in response to the initiation of the confirmation period (block 514). Example parameters of the confirmation period include a duration of the confirmation period and intervals at which conditions are reevaluated during the confirmation period. Different durations may be set for specific trading strategies, specific aspects of one or more trading strategies, types of trading strategies, specific tradeable objects, types of tradeable objects, etc. The duration can be defined by, for example, a number of received market updates, a fixed amount of time, or a dynamic amount of time that varies depending on one or more factors. Alternatively, the duration can be defined by a combination of a number of market updates, a fixed amount of time, and/or a dynamic amount of time that varies depending on one or more factors.

When the duration is defined by a number of received market updates and/or a fixed amount of time, the number and/or amount of time can be based on, for example, a user configurable setting and/or an identity of the market(s) in which the corresponding tradeable object is being traded, which the user may also set. For example, when the trading strategy indicates that the leaned-object is to be traded at a first exchange, the duration of the confirmation period is set to a first number of market updates, while the duration is set to a second (different) number of market updates when the trading strategy indicates that the leaned-on object is to be traded a second (different) exchange. As different exchanges or markets having different trends, tendencies, and/or patterns related to how often updates are issued and/or action is taken by traders, the ability to set the duration of the confirmation based on exchanges provides an ability to tailor the confirmation period accordingly. Additionally or alternatively, a user configurable setting may indicate that the duration of the confirmation period is a first amount of time for a first trading strategy and that the duration of the confirmation period is a second (different) amount of time for a second (different) trading strategy. In connection with some markets, objects, trading strategies, etc., the user may wish to be conservative regarding how long the analyzed market has to recover from the detected adjustment condition. However, in connection with other markets, objects, trading strategies, etc., the user may wish to be aggressive regarding how long the analyzed market has to recover from the detected adjustment condition. Enabling the user to set the duration of the confirmation to a certain fixed amount of time for different scenarios provides the user the ability to tailor the confirmation period and the advantages thereof to particular desires or strategies.

When the duration of the confirmation period is defined by a dynamic amount of time (rather than a fixed amount of time and/or a number of updates), the dynamic amount of time is based on, for example, a rolling average of amounts of time between received market updates associated with leaned-on object. To compute the rolling average, amounts of time between the market updates is tracked in, for example, a log or other type of data structure. A set of the most recent tracked values such as, for example, the most recent twenty amounts of time between market updates can be averaged to calculate a current value for the dynamic amount of time. The dynamic amount of time to define the duration of the confirmation can be the rolling average and/or some variant of the rolling average such as, for example, a percentage of the rolling average. Thus, the dynamic amount of time that can be used to define the duration of the confirmation period enables the confirmation period to be tailored to recent data that more accurately (relative to older data) reflects current market conditions.

In some examples, a combination of values defines the duration of the confirmation period. In such instances, the confirmation period can be set to expire upon, for example, the earliest of the component values or the latest component values. For example, when the duration of the confirmation period is defined based on a combination of a fixed amount of time and a number of market updates, the confirmation period can be set to expire when the fixed amount of time expires or the number of market updates have been received. Alternatively, when the duration of the confirmation period is defined based on a combination of a fixed amount of time and a dynamic amount of time, the confirmation period can be set to expire when the greater of the fixed amount of time and the dynamic amount of time expires. Additional or alternative combinations are possible.

Another example parameter for the confirmation period is an interval value at which the detected adjustment condition is reevaluated during the confirmation period. This parameter is referred to herein as the reevaluation interval. For example, assuming the duration of the confirmation period is ten (10) seconds, a reevaluation interval for the confirmation period can be set to, for example, two (2) seconds. In such instances, the condition that triggered the potential adjustment is reevaluated every two (2) seconds. In some examples, assuming the duration of the confirmation period is four (4) market updates, a reevaluation interval for the confirmation period can be set to, for example, one (1) market update. In such instances, the condition that triggered the potential adjustment is reevaluated each time a market update is received in connection with the corresponding tradeable object. In some examples, the reevaluation interval is set to equal the duration of the confirmation period such that a single reevaluation occurs at an end of the confirmation period.

When the confirmation period parameter(s), such as the duration, the reevaluation interval, and/or other parameters are obtained in the example of FIG. 5A, control proceeds to FIG. 5B. When control arrives at FIG. 5B, an adjustment condition has been detected (block 510 of FIG. 5A) and a confirmation period has been initiated (block 512 of FIG. 5A). Thus, when the reevaluation interval of the confirmation period occurs (block 516), the adjustment condition that triggered the confirmation period is reevaluated (block 518). In the illustrated example, the reevaluation includes calculating an available quantity of an object of the lean leg of the trading strategy at a time corresponding to the occurrence of the reevaluation interval. If the adjustment condition still exists (block 520), the adjustment triggered by the detected condition is prevented from occurring and control returns to FIG. 5A (block 522). In the illustrated example, such a scenario corresponds to the available quantity of the object of the lean leg returning to a level that does not violate the corresponding rule, such as a threshold quantity. Thus, the triggered adjustment, such as a reduction or cancellation of a quoting leg order, is not executed.

If the adjustment condition persists at the reevaluation interval (block 520), the duration of the confirmation period is referenced to determine whether the confirmation period has elapsed. As the duration of the confirmation period may be based on a plurality of possible factors, the example of FIG. 5B determines a basis for the duration and evaluates the corresponding definition. Although the example of FIG. 5B includes consideration of a plurality of bases for the duration, additional or alternative duration definitions are possible. In the example of FIG. 5B, if the duration of the confirmation period is based on an amount of time (block 524), such as a fixed amount of time or a dynamic amount of time, the definition of the duration is referenced to determine whether the amount of time has elapsed since the initiation of the confirmation period (block 526). In the illustrated example, if the amount of time defining the duration of the confirmation period has elapsed (block 526), the adjustment that triggered the confirmation period is executed and control returns to FIG. 5A (block 528).

When the duration of the confirmation period is based on an amount of time (block 524) and the amount of time has not elapsed (block 526), the definition of the duration is referenced to determine if the duration of the confirmation period is also based on a number of market updates (block 530). That is, the duration of the confirmation period may be based on a combination of an amount of time and a number of market updates. If the duration of the confirmation period is based on an amount of time (block 524), the amount of time has not elapsed (block 526), and the duration is not based on a number of market updates (block 530), control returns to block 516. However, if the duration of the confirmation period is based on an amount of time (block 524), the amount of time has not elapsed (block 526), and the duration is based on a number of market updates (block 530), the definition of the duration is referenced to determine whether the number of market updates has been received (block 532). If the number of market updates defining the duration of the confirmation period has been received (block 532), the adjustment that triggered the confirmation is executed and control returns to FIG. 5A (block 528). However, if the number of market updates defining the duration of the confirmation period has not been received (block 532), control proceeds to block 516.

Referring back to block 524, if the duration is not based on an amount of time, the example of FIG. 5B assumes that the duration is based on a number of market updates and control proceeds to block 532. However, additional or alternative approaches are possible.

FIG. 6 is a flowchart representative of example operations that can be executed to implement block 514 of FIG. 5A, which calculates and/or obtains a value for a duration of an initiated confirmation period. In the example of FIG. 6, a definition of the duration for the confirmation is referenced to determine whether the duration is based on a fixed amount of time and/or number of market updates (block 600). For example, one or more settings associated with the example trading device 110 of FIG. 1 and/or a dynamic trading tool associated with the trading device 110 may be set to a fixed value for the duration of the confirmation period across different trading strategies, across different types of tradeable objects, different markets, etc. If the duration is based on a fixed amount of time and/or a fixed number of market updates (block 600), the amount of time and/or the number of market updates is obtained for the current confirmation period (block 602). The example of FIG. 6 then ends (block 604).

Otherwise, the definition of the duration for the confirmation is referenced to determine whether the duration is based on a market or exchange at which an object of, for example, a lean leg of a trading strategy is to be traded according to, for example, the trading strategy (block 606). If so, an identifier of the specific market or exchange is used to obtain an amount of time and/or number of market updates from, for example, one or more user configuration settings that define the corresponding duration based on the identified market or exchange (block 608). The example of FIG. 6 then ends (block 604).

Otherwise, if the duration of the confirmation period is not based on a fixed amount of time or number of market updates and is not based on a market or exchange, the example of FIG. 6 assumes that the duration of the confirmation period is based on a dynamic factor (block 610). However, additional or additional bases for the duration are possible. In the illustrated example, the dynamic factor on which the duration is based is a rolling average of recent amounts of time between market updates. Additional or alternative dynamic factors are possible. So that the dynamic value for different instances of the duration can be calculated, the example of FIG. 6 logs an amount of time that has passed since the previous market update (block 612). Logging the amount of time includes storing the amount of time in any suitable data structure. The current value of the rolling average is calculated based on a set of the most recent log entries (block 614). A size of the set of entries to be used for the rolling average calculation can be set by, for example, a user and/or a trading tool acting on behalf of the user. The calculated value of the rolling average is used for the dynamic value on which the duration of the current confirmation period is based (block 616). The example of FIG. 6 then ends (block 604).

Figure 7:
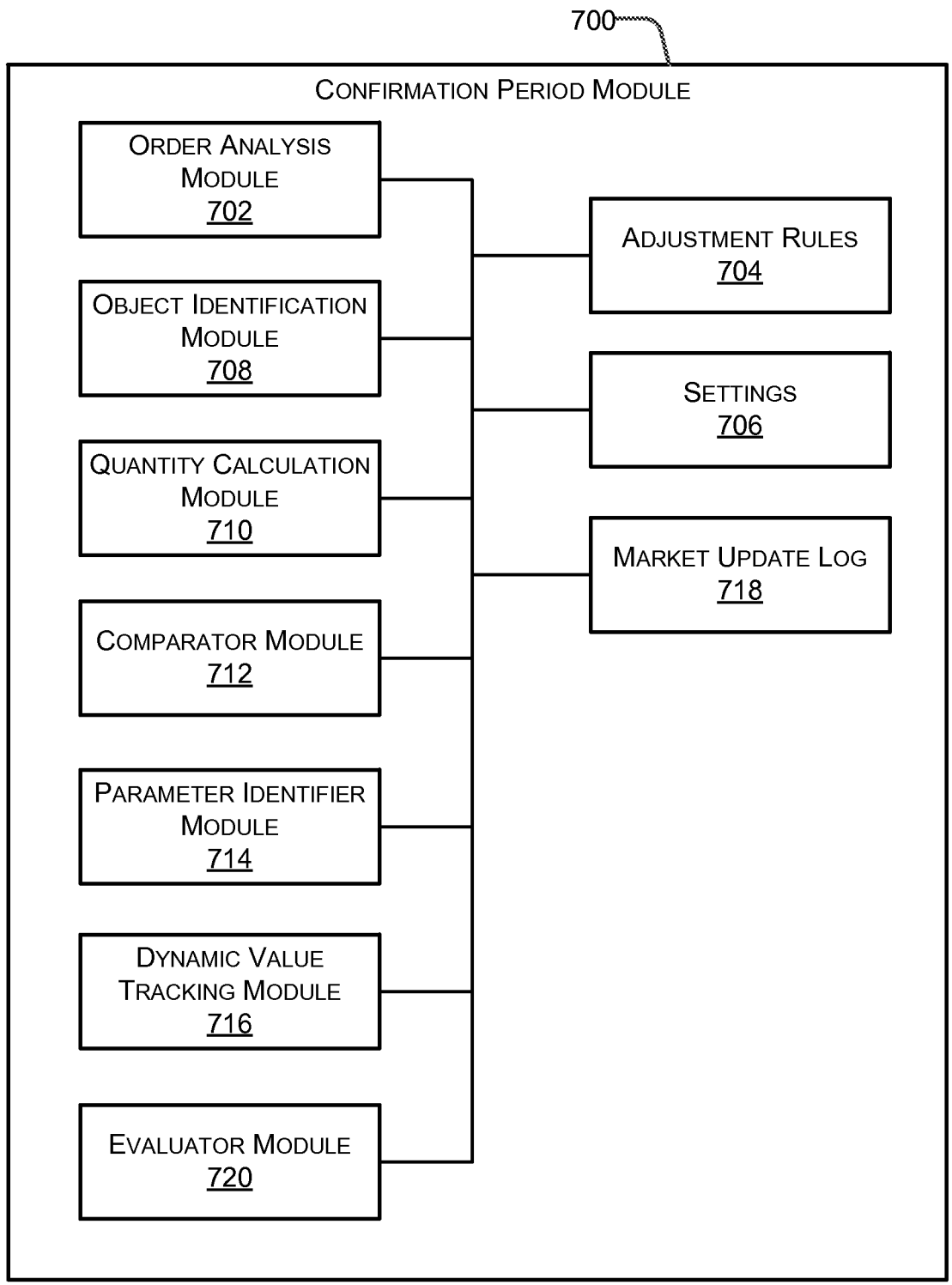
FIG. 7 is a block diagram representative of an example confirmation period module that can implement the example machine readable instructions of FIGS. 5A, 5B and/or 6.

FIG. 7 is a block diagram of an example confirmation period module 700 that may implement and/or execute the example operations of FIGS. 5A, 5B and/or 6. In some examples, the confirmation period module 700 may be implemented as a part of the trading application 330 associated with the trading device 110 of FIG. 1 and/or the trading device 210 of FIG. 2. In some examples, the confirmation period module 700 may be implemented as computer implemented code or instructions operable independent of a trading application. In some examples, the features and functionality of the confirmation period module 700 may be implemented in hardware operable in connection with the trading device 110 of FIG. 1 and/or the trading device 210 of FIG. 2.

While a trading strategy is being processed, a dynamic trading tool may detect a condition that triggers a potential adjustment to, for example, a quoting leg of the trading strategy. Such a condition may correspond to, for example, an available quantity of an object of a lean leg dropping below a threshold. In some instances, when such an adjustment condition is detected, the example confirmation period module 700 implements a confirmation period before the corresponding adjustment is executed. In some examples, the confirmation period module 700 of FIG. 7 performs one or more operations associated with the detection of the adjustment triggering condition. Alternatively, the example confirmation period module 700 may be initiated or called by another component, such as a dynamic trading tool associated with the adjustment triggering condition.

The example confirmation period module 700 of FIG. 7 includes an order analysis module 702 to receive and process a trading strategy, such as a spread, being executed by, for example, the trading device 110 of FIG. 1. The example order analysis module 702 identifies certain characteristics of the trading strategy such as, for example, a corresponding user and/or one or more settings and/or rules associated with the user and/or the specific trading strategy. In the illustrated example, the obtained settings and/or rules associated with the trading strategy and/or the corresponding user are loaded into a set of adjustment rules 704 and settings 706 for use in connection with the example confirmation period module 700. The example adjustment rules 704 of FIG. 7 include parameters of adjustment conditions that can trigger an adjustment of one or more aspects of the trading strategy, such as a cancellation of a quoting order or a change in the quantity of the quoting order. The example settings 706 of FIG. 7 include parameters that define the corresponding confirmation period such as, for example, a duration of the confirmation period, a basis on which the duration is defined, a reevaluation interval of the confirmation period, etc.

The example confirmation period module 700 of FIG. 7 includes an object identification module 708 to identify object(s) of the trading strategy such as, for example, tradeable object(s) of a quoting leg and/or tradeable object(s) of a lean leg. The example object identification module 708 of FIG. 7 also identifies markets or exchanges at which the identified object(s) are to be trading according to, for example, the trading strategy.

The example confirmation period module 700 of FIG. 7 includes a quantity calculation module 710 to calculate an available quantity of objects at one or more exchanges. For example, the quantity calculation module 710 calculates an available quantity of the identified object of the lean leg of the trading strategy. In some examples, the quantity calculation module 710 is used in connection with an effort to detect an adjustment condition of the trading strategy before a corresponding confirmation period has been initiated. In some examples, the quantity calculation module 710 is used in connection with a reevaluation of the adjustment condition after a corresponding confirmation period has been initiated. For example, the example quantity calculation module 710 may calculate an available quantity of a tradeable object when a reevaluation interval has occurred during the confirmation period.

The example confirmation period module 700 of FIG. 7 includes a comparator module 712 to compare results from the quantity calculation module 710 to, for example, one or more of the adjustment rules. In other words, the example comparator module 712 determines if an adjustment condition exists. In some examples, the comparator module 712 is used in connection with an effort to detect an adjustment condition of the trading strategy before a corresponding confirmation period has been initiated. In some examples, the comparator module 712 is used in connection with a reevaluation of the adjustment condition after a corresponding confirmation period has been initiated. For example, the example comparator module 712 may compare a current result generated by the quantity calculation module 710 to a violated one of the adjustment rules 704 that triggered the confirmation period when a reevaluation interval has occurred during the confirmation period.

The example confirmation period module 700 of FIG. 7 includes a parameter identifier module 714 to obtain one or more parameters regarding the confirmation period such as, for example, a duration of the confirmation period and/or a reevaluation interval of the confirmation period. In some examples, the parameter identifier module 714 obtains the parameter(s) directly from the settings 706. For example, when the duration of the confirmation period is based on a fixed amount of time or a fixed number of market updates, the parameter identifier module 714 references the settings to obtain the duration. In some examples, the parameter identifier module 714 uses the identity of one or more markets or exchanges associated with the trading strategy (as determined by the object identification module 708) to reference, for example, the settings 706. In such instances, the settings 706 include different parameter(s) for the confirmation period depending on the identity of the market(s)

and/or exchange(s) associated with the trading strategy. The example parameter identifier module 714 may obtain a reevaluation interval for the confirmation period in a similar manner as the duration of the confirmation period.

In some example, the parameter identifier module 714 interacts with a dynamic value tracking module 716 to obtain, for example, a duration of the confirmation period and/or a reevaluation interval when the duration and/or reevaluation interval of the confirmation period is based on or defined by a dynamic factor. For example, the duration of the confirmation period may be defined by an algorithm that determines a rolling average of amounts of time between market updates. In such instances, the dynamic value tracking module 716 maintains a market update log 718 such that the dynamic factor can be calculated based on recent data. Each time a first market update is received after a second market update, the example dynamic value tracking module logs an amount of time in between the first and second market updates in the market update log 718. The example dynamic value tracking module 716 uses the logged amounts of time to generate the rolling average based on a recent set of log entries. The amount of log entries to use in the calculation of the rolling average can be set by, for example, the dynamic value tracking module 716, a user, and/or a trading tool acting on behalf of a user. Further, the amount of log entries to use in the calculation of the rolling average and/or additional or alternative aspects of the dynamic factor calculation can depend on, for example, the corresponding market or exchange, the specific trading strategy, a type of the trading strategy, a specific tradeable object of the trading strategy, a type of one or more objects of the trading strategy, etc. The rolling average and/or a variant thereof, such as a fraction or percentage of the rolling average, can be used for a current instance of the confirmation period.

The example confirmation period module 700 of FIG. 7 includes an evaluator module 720 to determine whether an initiated confirmation period has elapsed and/or whether an interval associated with the reevaluation interval of the confirmation period has occurred. The confirmation period may elapse when, for example, an amount of time defining the duration of the confirmation period has elapsed since the initiation of the confirmation period and/or a number of market updates defining the duration of the confirmation period has been received since the initiation of the confirmation period. The example evaluator module 720 of FIG. 7 tracks an amount of time that has elapsed since the initiation of the confirmation period, a number of market updates received since the initiation of the confirmation period, and/or any other characteristic or data associated with the definition of the duration of the confirmation period. The example evaluator module 720 uses the tracked values to determine whether the duration of the confirmation period has expired.

While the evaluator module 720 indicates that the duration of the confirmation period has not elapsed, the example quantity calculation module 710 and the comparator module 712 reevaluate the condition that triggered the confirmation period at intervals according to the reevaluation interval. In the illustrated example of FIG. 7, if the condition that triggered the confirmation period ceases to exist during the confirmation period, the confirmation period module 700 generates an indication that the corresponding adjustment is to be prevented. The indication is received by the dynamic trading tool, which foregoes the triggered adjustment. In the illustrated example of FIG. 7, if the condition that triggered the confirmation period persists throughout the confirmation period, the confirmation period module 700 generates an indication that the corresponding adjustment should be made. The indication is received by the dynamic trading tool, which executes the adjustment. In some examples, more complex determinations regarding the generation of the indication are possible. For example, the confirmation period module 700 may determine whether the adjustment triggering condition existed for a certain percentage of the confirmation period and, if so, may generate an indication that the adjustment should be executed.

Some of the described figures depict example block diagrams, systems, and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, and/or any combinations thereof, for example.

The example block diagrams, systems, and/or flow diagrams may be implemented using any combination of application specific integrated circuit(s) (ASIC(s)), programmable logic device(s) (PLD(s)), field programmable logic device(s) (FPLD(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory (RAM), read-only memory (ROM), programmable read-only memory (PROM), electrically programmable read-only memory (EPROM), electrically erasable read-only memory (EEPROM), flash memory, a hard disk drive, optical media, magnetic tape, a file server, any other tangible data storage device, or any combination thereof. The tangible computer readable medium is non-transitory.

Further, although the example block diagrams, systems, and/or flow diagrams are described above with reference to the figures, other implementations may be employed. For example, the order of execution of the components, elements, blocks, and/or functionality may be changed and/or some of the components, elements, blocks, and/or functionality described may be changed, eliminated, sub-divided, or combined. Additionally, any or all of the components, elements, blocks, and/or functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A method for managing dynamic trading tools, the method comprising:

defining, by an order analysis component of a computing device, a trading strategy comprising a quoting leg associated with a first tradeable object and a lean leg associated with a second tradeable object;

receiving, by the order analysis component of the computing device, an adjustment rule, wherein the adjustment rule defines an adjustment condition based on an available order quantity at a price for the second tradeable object associated with the lean leg;

submitting, by the computing device, a first order message to a first electronic exchange for the first tradeable object in the quoting leg, wherein the first order message comprises an order to buy or sell a quantity of the first tradeable object at a price, wherein the order is pending execution and is placed at order queue position in an order queue at the first electronic exchange upon receiving the first order message at the first electronic exchange;

monitoring, by a quantity calculation component of the computing device, the available quantity of the second tradeable object in the lean leg for an occurrence of the adjustment condition based on market updates being received for the second tradeable object from a second electronic exchange, wherein the occurrence of the adjustment condition is detected when the available quantity reaches a predefined threshold;

detecting, by a comparator component of the computing device, the occurrence of the adjustment condition based on the available quantity of the second tradeable object;

in response to detecting the occurrence of the adjustment condition:

preventing, by the computing device, execution of an adjustment of the order for the first tradeable object in the quoting leg, wherein preventing execution of the order for the first tradeable object comprises refraining from sending an order message to the first electronic exchange to adjust the order for the first tradeable object in the quoting leg, and wherein preventing execution of the adjustment results in maintaining the order queue position of the order for the first tradeable object in the order queue at the first electronic exchange, wherein determining whether to execute the adjustment includes:

initiating, by a parameter identifier component of the computing device, a confirmation period and setting a duration of the confirmation period to a first number of market updates to be received from the second electronic exchange for the second tradeable object;

reevaluating, by the quantity calculation component and the comparator component of the computing device, the adjustment condition that initiated the confirmation period based on the available quantity of the second tradeable object in market updates being received for the second tradeable object during the confirmation period;

monitoring, by the computing device, a number of market updates being received for the second tradeable object to determine if the first number of market updates defining the duration of the confirmation period has been received from the second electronic exchange;

determining, by the computing device, an expiration of the confirmation period based on determining that the first number of market updates has been received;

if the adjustment condition is no longer satisfied upon reevaluating during the confirmation period, preventing, by the computing device, the adjustment of the order for the first tradeable object in the quoting leg upon determining the expiration of the confirmation period such that the order queue position of the first order is maintained in the order queue at the first electronic exchange; and if the adjustment condition continues to be satisfied upon reevaluating during the confirmation period, executing, by the computing device, the adjustment associated with the order for the quoting leg upon determining the expiration of the confirmation period, wherein the adjustment comprises sending a second order message to the first electronic exchange, wherein the second order message comprises a modified quantity or a modified price for the first tradeable object in the quoting leg.

2. The method of claim 1, wherein the duration of the confirmation period is configurable by a user.

3. The method of claim 1, wherein the duration of the confirmation period is further based on a fixed amount of time.

4. The method of claim 1, wherein the duration of the confirmation period is dynamically set based on a factor.

5. The method of claim 1, wherein the confirmation period is set based on the second electronic exchange, the trading strategy, or a market of one or more tradeable object associated with the trading strategy.

6. The method of claim 1, wherein the adjustment condition is re-evaluated at a re-evaluation interval defined for the confirmation period.

7. The method of claim 6, wherein the re-evaluation interval is configurable by a user.

8. The method of claim 6, wherein the re-evaluation interval is based on a fixed amount of time.

9. The method of claim 6, wherein the re-evaluation interval is based on a number of market updates for the second tradeable object.

10. The method of claim 6, wherein the re-evaluation interval is dynamically set based on a factor.

11. The method of claim 6, wherein the re-evaluation interval is set based on the second electronic exchange, the trading strategy, or a market of one or more tradeable object associated with the trading strategy.

12. The method of claim 1, wherein the adjustment further comprising sending a cancellation message to cancel the first order for the first tradeable object associated with the quoting leg.

13. The method of claim 1, wherein the available quantity at the price for the tradeable object associated with the adjustment condition comprises a lean on quantity at a lean on price for the second tradeable object.

14. The method of claim 13, wherein the lean on quantity is based on the quantity of the order in the quoting leg.

15. The method of claim 1, wherein the adjustment condition is detected when the available order quantity at the price for the second tradeable object associated with the lean leg falls below the predefined threshold.

* * * * *